(12) United States Patent
Yadav

(10) Patent No.: US 8,211,201 B2
(45) Date of Patent: Jul. 3, 2012

(54) CONTROLLED RELEASE FERTILIZERS AND METHODS OF MANUFACTURE

(75) Inventor: Santosh Yadav, Seattle, WA (US)

(73) Assignee: Cellulosetek, LLC, Seattle, WA (US)

(*) Notice: Subject to any disclaimer, the term of this patent is extended or adjusted under 35 U.S.C. 154(b) by 0 days.

(21) Appl. No.: 13/092,754

(22) Filed: Apr. 22, 2011

(65) Prior Publication Data

US 2011/0214466 A1 Sep. 8, 2011

Related U.S. Application Data

(63) Continuation of application No. 12/191,422, filed on Aug. 14, 2008, now Pat. No. 7,931,729.

(60) Provisional application No. 60/935,464, filed on Aug. 14, 2007, provisional application No. 60/994,247, filed on Sep. 17, 2007, provisional application No. 60/994,245, filed on Sep. 17, 2007.

(51) Int. Cl.
C05D 9/00 (2006.01)
C05F 11/00 (2006.01)
C05C 9/00 (2006.01)

(52) U.S. Cl. ............... 71/64.07; 71/28; 71/64.11

(58) Field of Classification Search ............... 71/64.07, 71/28, 64.11
See application file for complete search history.

(56) References Cited

U.S. PATENT DOCUMENTS

| | | | | |
|---|---|---|---|---|
| 3,001,228 A | * | 9/1961 | Nack | 264/7 |
| 4,004,870 A | * | 1/1977 | Guttinger et al. | 425/224 |
| 4,019,890 A | | 4/1977 | Fujita et al. | |
| 4,042,366 A | | 8/1977 | Fersch et al. | |
| 4,369,055 A | | 1/1983 | Fujita et al. | |
| 5,147,443 A | | 9/1992 | Diehr et al. | |
| 5,176,734 A | | 1/1993 | Fujita et al. | |
| 5,211,985 A | | 5/1993 | Shirley, Jr. et al. | |
| 5,374,292 A | | 12/1994 | Detrick et al. | |
| 5,395,560 A | | 3/1995 | Schwager | |
| 5,435,821 A | | 7/1995 | Duvdevani et al. | |
| 5,858,094 A | | 1/1999 | Detrick et al. | |
| 6,231,633 B1 | | 5/2001 | Hirano et al. | |
| 6,338,746 B1 | | 1/2002 | Detrick et al. | |
| 6,398,989 B1 | | 6/2002 | Bergstrom | |
| 6,510,941 B2 | * | 1/2003 | Schermutzki et al. | 198/836.1 |
| 6,716,498 B2 | * | 4/2004 | Curro et al. | 428/34.8 |
| 6,749,659 B1 | | 6/2004 | Yu et al. | |
| 6,818,087 B1 | * | 11/2004 | Roreger et al. | 156/145 |
| 7,452,399 B2 | * | 11/2008 | Whittington | 71/63 |
| 7,572,525 B2 | * | 8/2009 | McDonald | 428/703 |
| 7,931,729 B2 | * | 4/2011 | Santosh | 71/64.07 |
| 2003/0176853 A1 | * | 9/2003 | Brines et al. | 604/890.1 |
| 2004/0067305 A1 | * | 4/2004 | Nageli et al. | 427/180 |
| 2005/0163714 A1 | * | 7/2005 | Sukhishvili et al. | 424/9.6 |
| 2006/0024480 A1 | | 2/2006 | Lyons et al. | |
| 2006/0275335 A1 | | 12/2006 | McKernan et al. | |

* cited by examiner

*Primary Examiner* — Wayne Langel
(74) *Attorney, Agent, or Firm* — Frommer Lawrence & Haug LLP; Patrick R. Turner

(57) ABSTRACT

A method of manufacturing a controlled release fertilizer wherein the fertilizer is deposited onto a first polymer film and then covered by a second polymer film to encapsulate the fertilizer between the first polymer film and the second polymer film.

28 Claims, 5 Drawing Sheets

CONTROLLED RELEASE FERTILIZERS AND METHODS OF MANUFACTURE

CROSS REFERENCE TO RELATED APPLICATION

This application is a continuation of U.S. application Ser. No. 12/191,422, filed Aug. 14, 2008, which claims priority to U.S. Provisional Application Ser. No. 60/935,464 filed Aug. 14, 2007, U.S. Provisional Application Ser. No. 60/994,247 filed Sep. 17, 2007, and U.S. Provisional Application Ser. No. 60/994,245 filed Sep. 17, 2007, the complete disclosures of which are hereby expressly incorporated by this reference.

BACKGROUND

Most commercial fertilizers, such as urea, dissolve quickly in water. When applied to lawns or agricultural crops, most of the fertilizer dissolves rapidly in the moisture in the soil. Often, such fertilizers dissolve at a rate that exceeds the rate at which it can be used by plants. This can cause a number of significant problems. First, the excess fertilizer can leach into the groundwater, where it can cause potentially serious environmental damage. In addition, excessive concentration of fertilizer in the vicinity of a plant may result in "burning" of the plant roots.

Because of these problems, it is often necessary to apply these fertilizers in several light doses throughout the growing season, rather than in a single heavy application. However, the need for repeat applications increases labor costs. Worse, repeat applications may cause physical damage to the growing plants because the fertilizer spreading equipment must pass over the plants several times.

In order to avoid the need for repeat applications, various slow or controlled release fertilizers have been developed. For examples, see U.S. Pat. Nos. 4,042,366, 5,147,443, 5,435,821, and 6,231,633. These fertilizers can be applied at the beginning of the growing season and provide an initial high release of fertilizer followed by a slower, gradual release throughout the growing season. Slow or controlled release fertilizers are widely used on home lawns, public lawns, golf courses, home gardens, plant nurseries, and on horticultural crops.

Polymer coated fertilizers are the most technically advanced controlled release fertilizers. Different methods of manufacturing are utilized to produce polymer coated fertilizers. For examples, see U.S. Pat. Nos. 4,019,890, 4,369,055, 5,176,734, 5,211,985, 5,374,292, 5,858,094, and 6,338,746. Polymer coated controlled release fertilizers are typically produced by coating water insoluble semi-permeable polymer layer onto the fertilizer granules. Over time the fertilizer is released into the soil through diffusion from this semi-permeable coating. One of the disadvantages in existing methods is that uniform polymer coating thickness is difficult to achieve. Another disadvantage is that it is hard to control the thickness of the polymer that is applied the fertilizer. Yet another disadvantage is that most of these manufacturing processes are batch type processes which are expensive. Yet another disadvantage with existing processes is that they require multiple applications of polymer to increase the thickness of the polymer coating around the fertilizer.

SUMMARY

A method of manufacturing a controlled release fertilizer wherein the fertilizer is deposited onto a first polymer film and then covered by a second polymer film to encapsulate the fertilizer between the first polymer film and the second polymer film.

DETAILED DESCRIPTION

The invention provides a method of manufacturing a controlled release fertilizer 14 wherein the fertilizer 14 is deposited onto a first polymer film and then covered by a second polymer film to encapsulate the fertilizer 14 between the first polymer film and the second polymer film. The preferred polymer film is any suitable polymer. The fertilizer 14 may be any suitable fertilizer, including urea.

Figure 1:
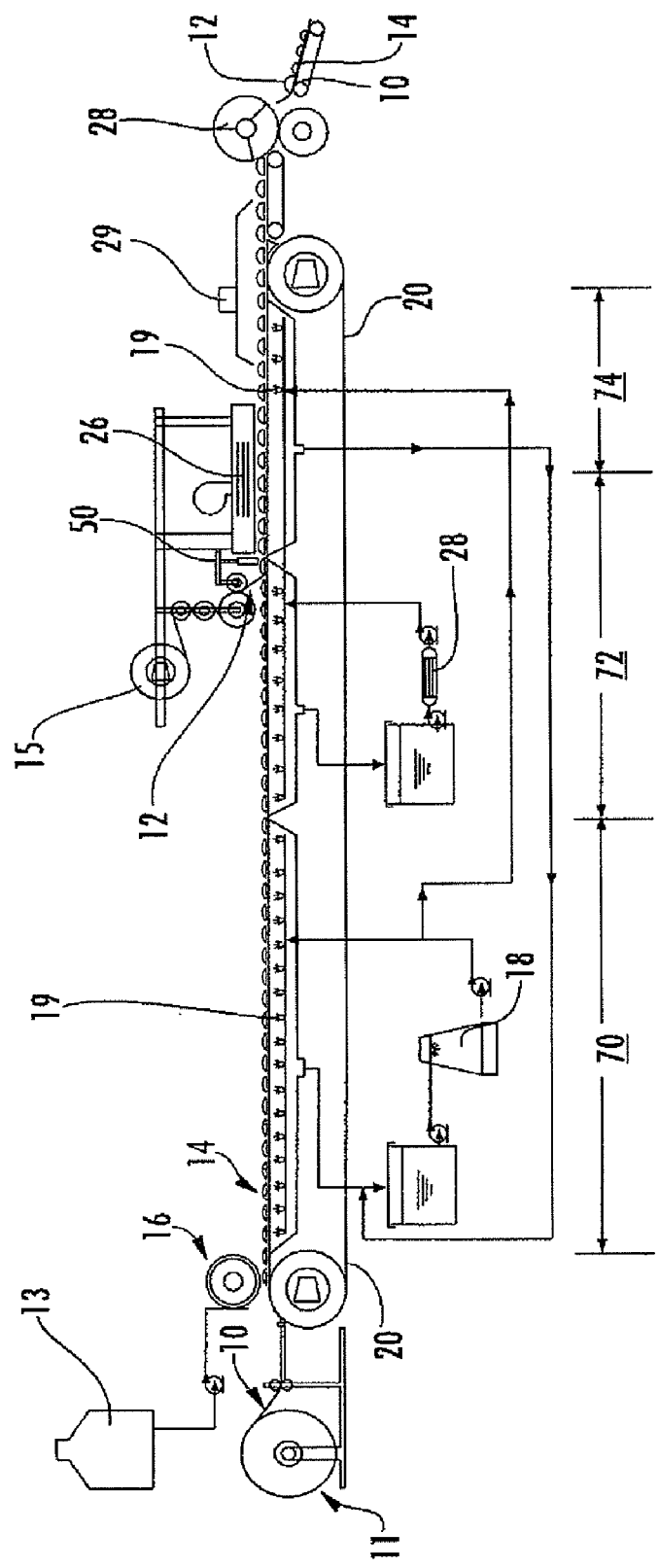
FIG. 1 shows an embodiment of the fertilizer coating process wherein the top layer of polymer film is laminated onto the fertilizer.
Figure 2:
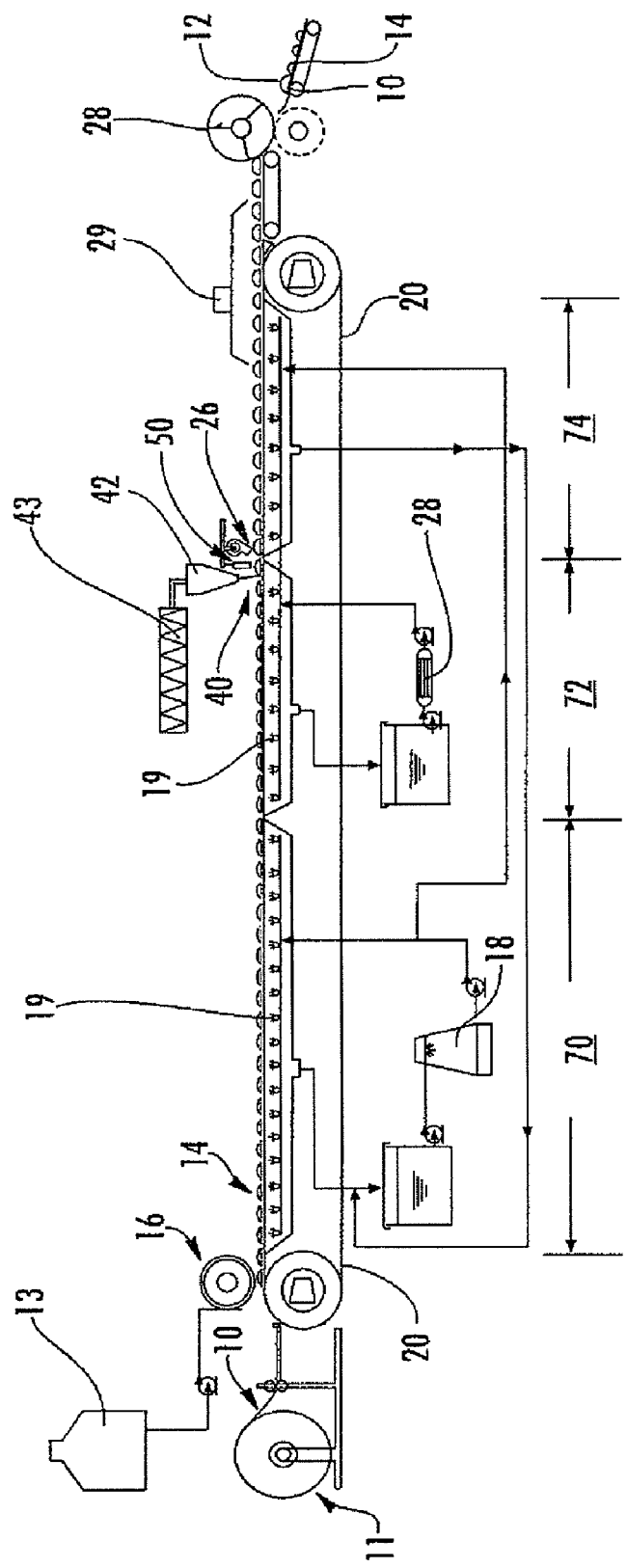
FIG. 2 shows an alternate embodiment of the fertilizer coating process wherein the top layer of polymer film is extruded onto the fertilizer.
Figure 3:
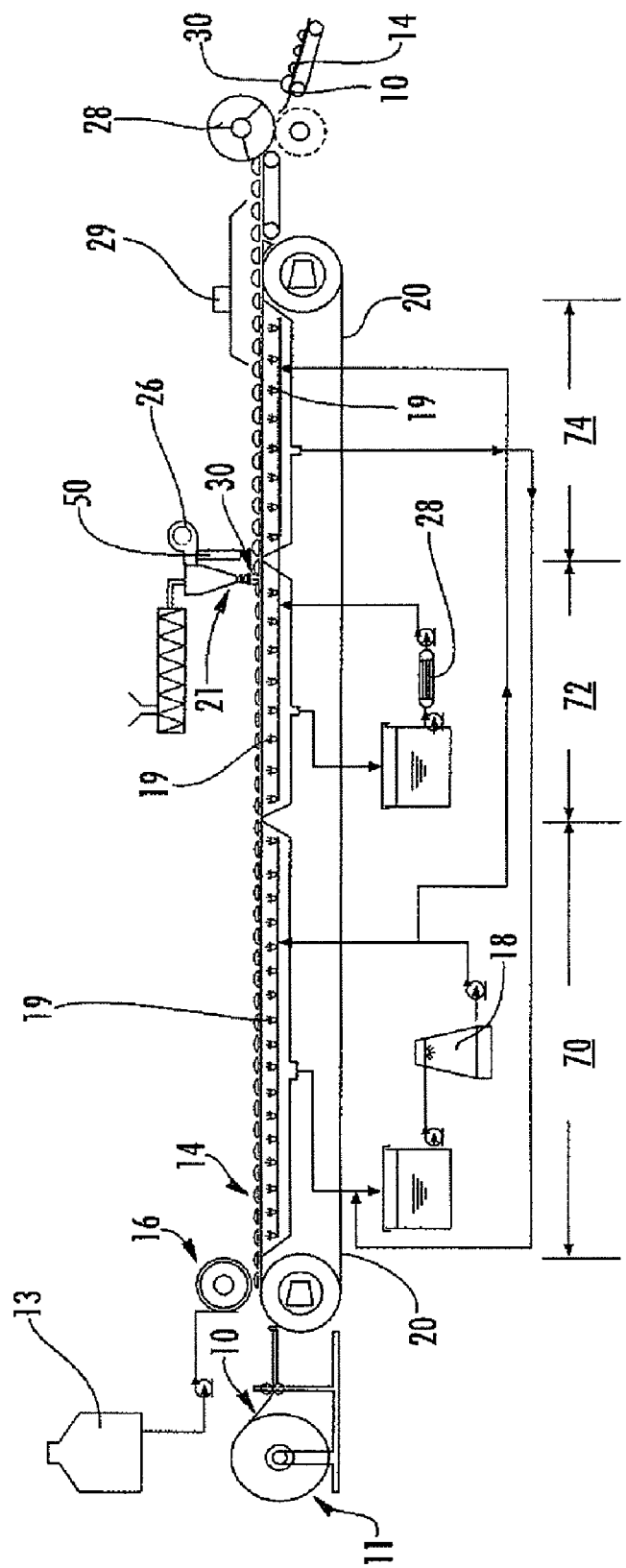
FIG. 3 shows an alternate embodiment of the fertilizer coating process wherein the polymer film is formed by spraying a solution of polymer onto the fertilizer surface.

FIG. 1 shows an embodiment wherein the first polymer film is a roll 11 of polymer film 10 that is directed under a fertilizer deposition station 16 which deposits fertilizer 14 onto the moving polymer film 10. FIGS. 1-3 show that the roll 11 of polymer film 10 allows the controlled release fertilizer production process to be continuous in that the steps of the process can be performed sequentially without interruption. In some embodiments, a conveyor belt 20 or a similar conveyance device may be used to assist with moving the polymer film 10 through the production process. As will be discussed below, in some embodiments the conveyance device is made of a material having a relatively high thermal conductivity, such as steel.

Figure 5:
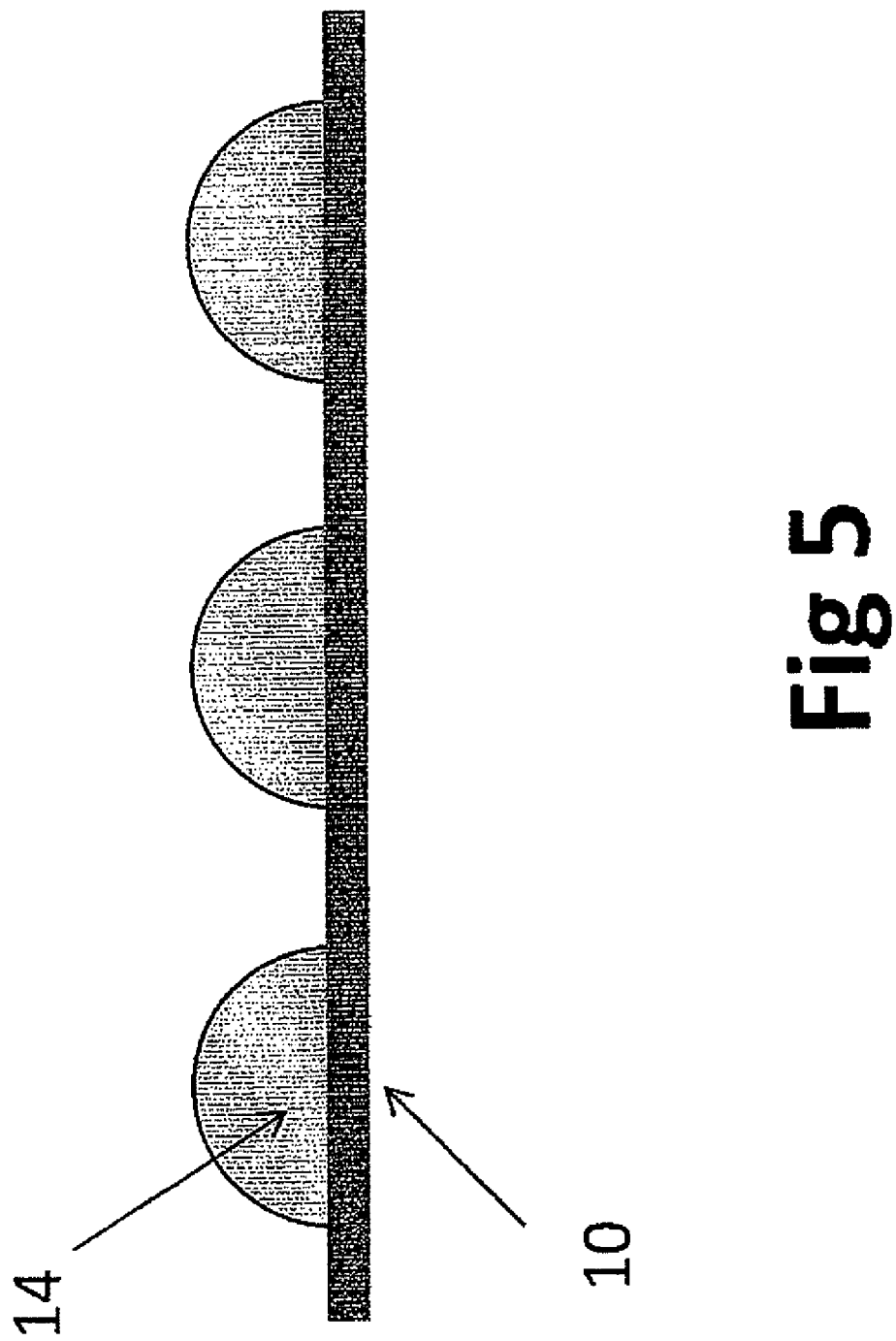
FIG. 5 shows a side view of the fertilizer droplets after having been deposited onto the first polymer film but before being covered by the second polymer film.

The fertilizer 14 is deposited onto the film 10 at the fertilizer deposition station 16, which may be any suitable device capable of depositing fertilizer 14 onto the film 10. Examples of fertilizer deposition stations 16 are described in U.S. Pat. Nos. 6,398,989 and 5,395,560. The preferred embodiment deposits molten (liquid) fertilizer 14 onto the film 10, however, in other embodiments, solid granules of fertilizer may be deposited onto the polymer film 10. The preferred deposition station 16 is a Rotoformer (developed by Sandvik Corporation). This fertilizer deposition station 16 deposits the drops of fertilizer 14 at approximately equal distances from each other onto the film 10. FIG. 5 shows several molten fertilizer 14 droplets that have been deposited onto the polymer film 10.

Figure 4:
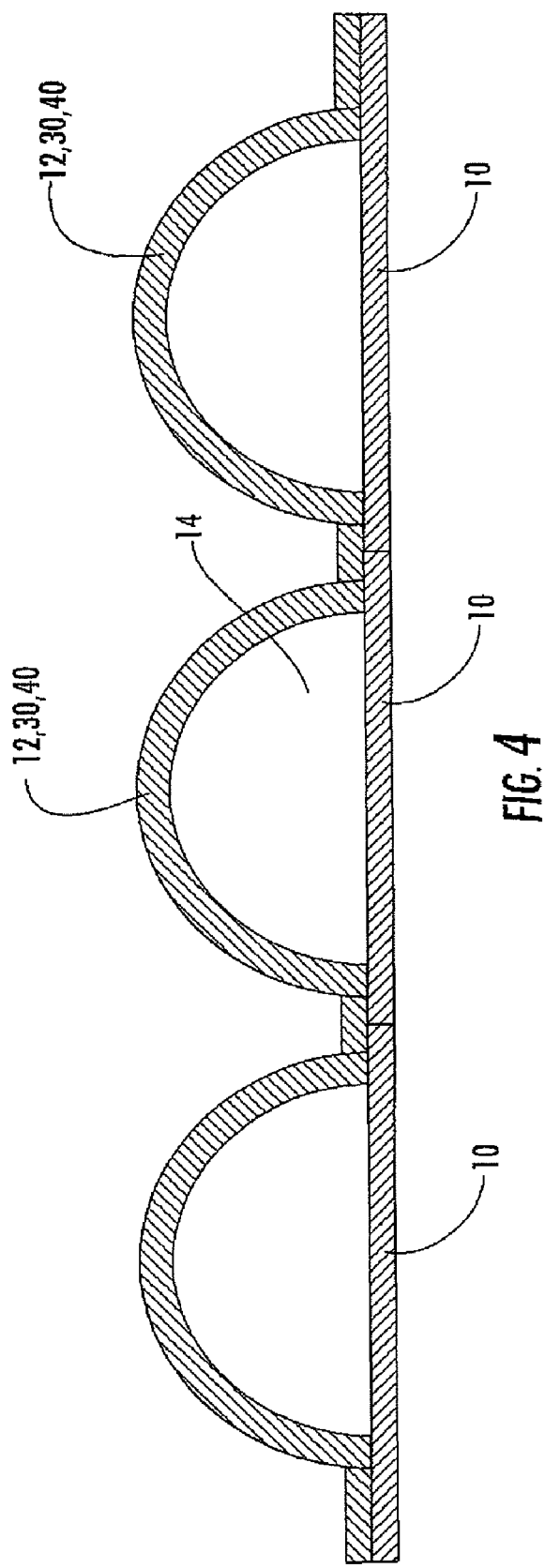
FIG. 4 shows a side view of the fertilizer droplets after having been encapsulated by the polymer films.

In the embodiment where the deposited fertilizer 14 is in its molten state, the fertilizer 14 is shaped like a hemisphere after being deposited on the film 10. This hemispherical shape is seen best in FIG. 4. The hemispheric shape allows the fertilizer 14 to comprise a curved top portion and a generally flat bottom portion. The flat portion can be used as a carrier for other chemicals by laminating paper onto it. To accomplish this, a polymer film is first laminated to a paper web. Then the film is fed under the fertilizer deposition station 16 for fertilizer 14 deposition onto the polymer side.

As shown in FIGS. 1-3, in some embodiments of the invention the fertilizer 14 droplets encounter a cooling zone 70 after being deposited onto polymer 10. The cooling zone 70 subjects the fertilizer 14 to cooler temperatures to help solidify and cool the molten fertilizer 14 droplets after they have been deposited onto the film 10 and before the second polymer film is applied. In one embodiment shown in FIGS. 1-3, the cooling effect is achieved by spraying cool water onto the underside of the conveyor belt 20 through nozzles 19. After contacting and cooling the conveyor belt 20, the water drains back into a holding tank for reuse. The heat from the fertilizer 14 is transferred to the cooled conveyor belt 20. In this embodiment, it is beneficial for the conveyor belt 20 to be made of metal to allow the heat from the fertilizer 14 to be easily transferred to the belt 20. A chilling tower 18 or some similar means may be used to cool the water before it is sprayed onto the conveyor belt 20. In an alternate embodiment, the cooling zone 70 may be achieved by blowing cool air over the top of the fertilizer 14.

After the fertilizer 14 droplets have hardened, the second polymer film is deposited onto the top of the fertilizer 14. In the embodiment shown in FIG. 1, the second polymer film is polymer 12 which is placed over the fertilizer 14 in a thermal lamination process to encapsulate the fertilizer 14 between the second (top) polymer film 12 and the first (bottom) layer of polymer film 10. This polymer film 12 film may be stored on a roll 15 that is similar to the roll 11 used to store the bottom polymer layer 10. A heating unit 26 such as a hot air blower is used to apply heat after the top layer of laminate polymer 12 has been applied. The heat from the heating unit 26 helps to soften the polymer layers 10, 12 and fuse them together to encapsulate the fertilizer 14 between the layers of polymer 10, 12. Other heating devices such as radiant heaters may also be used in place of hot air blower 26.

In an alternate embodiment show in FIG. 2, the second polymer film is polymer 40. In this embodiment, the top polymer film 40 is extruded onto the fertilizer 14 after the fertilizer 14 has been deposited onto the polymer film 10. In this embodiment, the lower polymer film 10 containing deposited fertilizer 14 is directed toward the extruder 43 where an extrusion die 42 deposits a layer of molten polymer 40 onto the deposited fertilizer 14. This results in the fertilizer 14 being encapsulated between the lower polymer film 10 and the upper polymer film 40. In some embodiments, a compressed air blower 22 is used to help spread the extruded polymer 40 onto the fertilizer 14.

In an alternate embodiment shown in FIG. 3, the second polymer film is polymer 30. In this embodiment, after the fertilizer 14 is deposited onto the film 10, the lower polymer film 10 is directed into polymer spraying station 32 where a polymeric solution 30 is sprayed onto deposited fertilizer 14 through nozzle 21. The sprayed polymer 30 results into polymer film 30. The fertilizer 14 is encapsulated between the lower polymer layer 10 and the upper polymer layer 30.

As shown in FIGS. 1-3, in some embodiments of the invention the fertilizer 14 droplets encounter a heating zone 72 before and/or during the time when the second polymer film is applied. The heating zone 72 helps to remove any moisture present on the polymer film 10 to help the second polymer film stick to the fertilizer 14 and fuse with the bottom layer of polymer 10. In one embodiment, the heating zone 72 is created by spraying warm water onto the underside of the conveyor belt 20 through nozzles 19.

The heat is transferred through the conveyor belt 20 to the fertilizer 14 droplets while the water drains into a holding take for reuse. A heat exchanger 28 or some similar means may be used to heat the water. Other heating devices such as radiant heaters can be used.

As shown in FIGS. 1-3, some embodiments use a static charge generator 50 to help fuse the second polymer film with the fertilizer 14 surface and the first polymer film. In one embodiment, the static charge generator 50 consists of a DC high voltage generator and one or several charging electrodes. The generator generates the high voltage for the high voltage points in the electrodes. The high voltage points produce ions to charge the materials, which then adhere to each other or to other surfaces electrostatically.

As shown in FIGS. 1-3, in some embodiments the fertilizer 14 droplets encounter a second cooling zone 74 after the second polymer film has been deposited. The second cooling zone 74 helps to cool the encapsulated fertilizer 14 and the polymer layers to make it easier to cut the encapsulated fertilizer 14 apart The second cooling zone 74 can operate in a manner similar to the first cooling zone 70 discussed above. As shown in FIGS. 1-3, the second cooling zone 74 may use the same water tank and chilling tower 18 as the first cooling zone 70 discussed above. In addition to the second cooling zone 74, some embodiments also use a cold air fan 29 to cool the encapsulated fertilizer 14 after the second polymer film has been applied The cool air fan 29 helps to cool the fertilizer 14 and polymer layers and bring them toward room temperature. The cooling of the fertilizer 14 and first and second polymer films makes it easier to cut apart the encapsulated fertilizer 14 droplets.

The final step of the process is to separate the individually encapsulated fertilizer 14 droplets so that the individual pellets may be spread onto the ground. This cutting step may be performed by any suitable cutting device, including a laser or a punching machine. In one embodiment, the cutting device is a standard cutting machine like those used in processes to cut labels, paper, or packaging cartons.

The release rate of the fertilizer 14 in the controlled release fertilizer pellets can be controlled by varying the composition and thickness of the polymer films. The present invention allows a high degree of control related to the type and quantity of the polymer used and thus allows the release rate of the final product to be specifically tailored to fit many different growing situations. The ability to use a wide range of polymers with tight control over coating thickness provides a very precise and predictable fertilizer release rate.

One reason the invention allows a high degree of release rate control is because many different types of polymer compositions may be used in the present invention. This is beneficial because different polymers may have different moisture barrier properties which can result in varying fertilizer 14 release rates. For example, the following polymer films may all be used: virgin/recycled polyethylene, biopolymers, polypropylene, polystyrene, high impact polystyrene, acrylonitrile butadiene styrene, polyethylene terephthalate, polyester, polyamides, polyvinyl chloride, polyurethanes, polycarbonate, polyvinylidene chloride, polylactic acid, starch based polymers, and aminoplastic resin. One reason a wide variety of polymers may be used with this invention is because polymer film formation onto the fertilizer 14 surface is not required to bind the polymers to the fertilizer Further, for all embodiments described above, the first polymer film (bottom layer of polymer 10) may be made of a different composition than the second polymer film (top layer of polymer 12, 30, 40).

Another reason the invention allows a high degree of release rate control is because the lamination (FIG. 1), extrusion (FIG. 2), and spray methods (FIG. 3) for depositing the top layer of polymer may be intermixed. For example, one embodiment may employ all three methods of depositing the top layer of polymer in the same run cycle. Other embodiments may employ two of the three methods for depositing the top layer of polymer. When intermixing the polymer deposition methods, different polymer compositions may be used. For example, it is possible to laminate one type of polymer film composition onto the top of the fertilizer and then spray another polymer film composition onto the top of that.

Yet another reason why invention allows a high degree of release rate control is because top polymer film 12, 30, 40 and bottom polymer film 10 may be made of multiple layers of different polymers and these layers may have different thickness. For example the top layer 12, 30, 40 and bottom layer 10 may have two or more layers of polymers each and these layers may have different thicknesses.

Yet another reason why the invention allows a high degree of release rate control is because the first and second polymer films may be made of different thicknesses. The first and second polymer films may be pre-manufactured using cast/blown film extrusion or co-extrusion process. These processes are well known commercially and are commonly used to manufacture polymeric films of very precise thickness. Another advantage of this process is the ability to make films of multiple layers. For example a film containing seven or more layers of different polymers of different thicknesses can be made at high speed using cast film co-extrusion process.

Yet another reason the invention provides a high degree of fertilizer release rate control is that various additives may be added into the polymer films during manufacturing for customizing the film properties. For example hydrophilic additives may be added into the polymer during the manufacturing to increase the fertilizer release or biodegradation additive may be added for customizing the polymer rate of degradation in soil.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:

1. A method of manufacturing a controlled release fertilizer, said method comprising the steps of:
   depositing a plurality of fertilizer droplets onto a first polymer film, wherein the fertilizer droplets are hemispherical; and
   applying a second polymer film onto the fertilizer droplets to encapsulate the fertilizer droplets between the first polymer film and the second polymer film such that the fertilizer droplets are releasable over time by diffusion through at least one of the first polymer film or the second polymer film.

2. The method of claim 1 wherein the second polymer film is laminated onto the fertilizer.

3. The method of claim 1 wherein the second polymer film is extruded onto the fertilizer.

4. The method of claim 1 wherein the second polymer film is sprayed onto the fertilizer.

5. The method of claim 1 wherein the first polymer film is made from a different composition than the second polymer film.

6. The method of claim 1 further comprising the step of applying a third polymer film onto the fertilizer to further encapsulate the fertilizer.

7. The method of claim 6 wherein the third polymer film is laminated onto the fertilizer.

8. The method of claim 6 wherein the third polymer is extruded onto the fertilizer.

9. The method of claim 6 wherein the third polymer is sprayed onto the fertilizer.

10. The method of claim 6 wherein the first polymer film, second polymer film, and third polymer film are all made from different compositions.

11. The method of claim 6, wherein the second polymer film is laminated onto the fertilizer and the third polymer film is sprayed onto the fertilizer, over the top of the second polymer film.

12. The method of claim 1, wherein the first and second polymer films have different thicknesses from one another.

13. The method of claim 1, wherein the second polymer film is applied to the fertilizer by two of lamination, extrusion, and spraying.

14. The method of claim 1, wherein the second polymer film is applied to the fertilizer by each of lamination, extrusion, and spraying.

15. The method of claim 1, further comprising adding a biodegradation additive to at least one of the first polymer film or the second polymer film.

16. The method of claim 1, further comprising adding a hydrophilic additive to at least one of the first polymer film or the second polymer film.

17. The method of claim 1, wherein the first and second polymer films are pre-manufactured using a co-extrusion process.

18. A controlled release fertilizer obtained by the process of claim 1.

19. A method of manufacturing a controlled release fertilizer, said method comprising the steps of:
   depositing a plurality of fertilizer droplets onto a first polymer film, wherein the fertilizer droplets are hemispherical;
   cooling and hardening the fertilizer droplets by passing them through a first cooling zone;
   heating the fertilizer droplets by passing them through a heating zone to help remove any moisture present on the first polymer film;
   applying a second polymer film onto the fertilizer to encapsulate the fertilizer between the first polymer film and the second polymer film such that the fertilizer droplets are releasable over time by diffusion though at least one of the first polymer film or the second polymer film;
   statically charging the first and second polymer films to help fuse them together; and
   cooling and hardening the encapsulated fertilizer droplets by passing them through a second cooling zone.

20. The method of claim 19 wherein the second polymer film is laminated onto the fertilizer.

21. The method of claim 19 wherein the second polymer film is extruded onto the fertilizer.

22. The method of claim 19 wherein the second polymer film is sprayed onto the fertilizer.

23. A controlled release fertilizer obtained by the process of claim 19.

24. A method of manufacturing a controlled release fertilizer, said method comprising the steps of:
   depositing a plurality of fertilizer droplets onto a first polymer film, wherein the fertilizer droplets are hemispherical;

moving the first polymer film through the manufacturing process on a conveyor belt;

cooling the fertilizer droplets by passing them through a first cooling zone which sprays cool water on the underside of the conveyor belt;

heating the fertilizer droplets by passing them through a heating zone which sprays hot water on the underside of the conveyor belt;

applying a second polymer film onto the fertilizer to encapsulate the fertilizer between the first polymer film and the second polymer film such that the fertilizer droplets are releasable over time by diffusion though at least one of the first polymer film or the second polymer film; and cooling the encapsulated fertilizer droplets by passing them through a second cooling zone which sprays cool water on the underside of the conveyor belt.

25. The method of claim 24 wherein the second polymer film is laminated onto the fertilizer.

26. The method of claim 24 wherein the second polymer film is extruded onto the fertilizer.

27. The method of claim 24 wherein the second polymer film is sprayed onto the fertilizer.

28. A controlled release fertilizer obtained by the process of claim 24.

* * * * *

UNITED STATES PATENT AND TRADEMARK OFFICE
CERTIFICATE OF CORRECTION

| | | |
|---|---|---|
| PATENT NO. | : 8,211,201 B2 | |
| APPLICATION NO. | : 13/092754 | |
| DATED | : July 3, 2012 | |
| INVENTOR(S) | : Santosh Yadav | |

It is certified that error appears in the above-identified patent and that said Letters Patent is hereby corrected as shown below:

In the Specifications:

In column 4, line 18, delete "apart" and insert -- apart. --, therefor.

In column 4, line 25, delete "applied" and insert -- applied. --, therefor.

In column 4, line 60, delete "fertilizer" and insert -- fertilizer. --, therefor.

In the Claims:

In column 6, line 6, in Claim 8, delete "polymer" and insert -- polymer film --, therefor.

In column 6, line 8, in Claim 9, delete "polymer" and insert -- polymer film --, therefor.

Signed and Sealed this
First Day of January, 2013

David J. Kappos
*Director of the United States Patent and Trademark Office*